Nov. 6, 1923.
H. M. MARSHALL
ANIMAL TRAP ATTACHMENT
Filed April 24, 1922
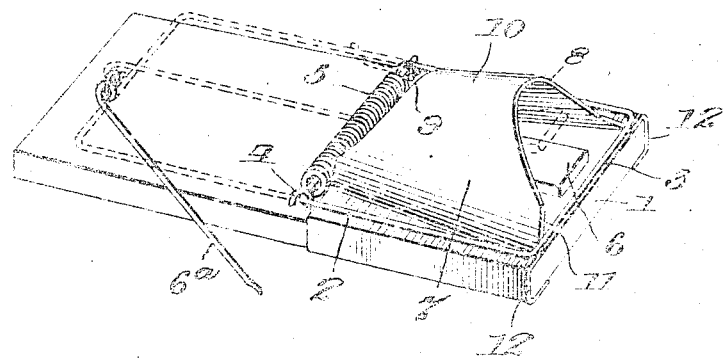
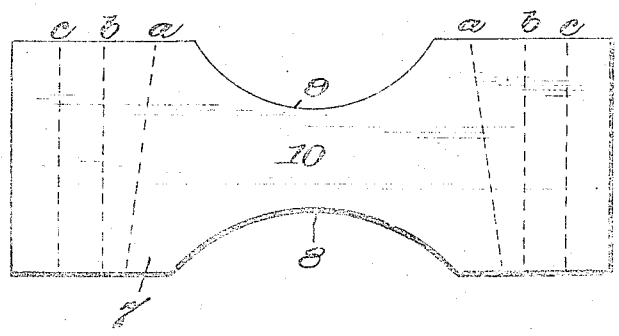
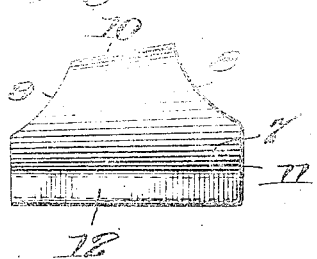
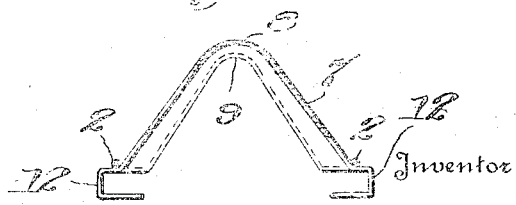

Patented Nov. 6, 1923.

1,473,242

UNITED STATES PATENT OFFICE.

HORACE M. MARSHALL, OF VICKSBURG, MISSISSIPPI.

ANIMAL-TRAP ATTACHMENT.

Application filed April 24, 1922. Serial No. 556,145.

*To all whom it may concern:*

Be it known that I, HORACE M. MARSHALL, a citizen of the United States, residing at Vicksburg, in the county of Warren and State of Mississippi, have invented certain new and useful Improvements in Animal-Trap Attachments, of which the following is a specification.

This invention relates to animal traps and more particularly to traps for rats and mice.

A well known form of trap consists of a flat base or platform on which is mounted a swinging spring-actuated bail or jaw, and a pivoted trigger or bait holder located within the bail when the same is in victim-holding position.

It has been found in practice, however, that traps of this character sometimes fail to catch because of the fact that it is possible for the animal to reach the trigger or bait holder while standing in a position out of the path of movement of the spring jaw. The object of the present invention is to provide an attachment for traps of this character which, when applied to the trap, will form a guard or housing over the trigger, so shaped as to render it impossible for the animal to gain access to the bait holder without placing itself in the path of movement of the bail or jaw. While, of course, traps may be manufactured with my improved attachment already secured thereto, I also contemplate manufacturing the attachment separately, so that it may be sold independently and applied by the purchaser, to existing make of traps.

In order that the invention may be readily understood, reference is had to the accompanying drawing, forming part of this specification, and in which:—

Fig. 1 is a perspective view of a well known form of trap showing my improved attachment applied thereto.

Fig. 2 is a view of the blank from which my improved attachment is formed.

Fig. 3 is a side elevation of the attachment itself; and

Fig. 4 is a front elevation thereof, the position of the swinging bail being also shown.

Referring to the drawings in detail, the trap for which my attachment is adapted comprises a base or platform 1 usually made of wood, and a swinging bail comprising the side portions 2 and the transverse portion 3, such bail being pivoted to the base 1 as at 4, and operatively connected with an actuating spring 5. The trap is set by swinging the bail back into the dotted line portion as shown in Fig. 1 and securing it by means of the holding bar 6ª, the forward end of which is engaged with a pivoted trigger or bait holder 6, all as is well understood in the art.

My improved attachment or guard is designated in its entirety by the reference numeral 7 and consists of a piece of sheet material, such as sheet metal, celluloid or the like, preferably cut away on its opposite sides, as indicated at 8 and 9 in Fig. 2. The cut away portion 9 is preferably smaller than the portion 8, and may in some cases be entirely omitted.

The blank or piece of sheet material is scored, perforated, or otherwise weakened along a plurality of definite lines as indicated at $a$, $b$ and $c$ in Fig. 2, so that the sheet may be bent or folded along such lines.

When applied to the trap, the piece of sheet material is bent up at its middle portion 10 to form an arch shaped housing as clearly shown in the drawing, and its end portions are folded along the lines $a$, $b$ and $c$ to form channels 12 which embrace opposite edges of the base 1.

It will be noted that when the guard or housing is in position on the trap, as shown in Fig. 1, it occupies substantially the entire space between the spring 5 and the forward edge of the base, or in other words, the entire space within the bail when the same is in victim-holding position, as shown in full lines. The front edge 11 of the guard or housing lies just within and adjacent to the path of movement of the cross bar 3 of the bail, and the side members 2 of the bail fit down on either side of the housing as shown in Fig. 4.

It will be seen that the housing is open at its ends, but that it preferably slopes rearwardly, as shown best in Fig. 3, so that access to the trigger or bait holder can be had only from the front end, and in order to enter such open end it is necessary for the animal to place itself directly in the path of movement of the cross bar 3 of the bail. Cutting away the front edge of the guard as at 8 affords easier access to the trigger and also affords ample clearance between the housing and bail.

Traps may be manufactured with my improved guard or housing permanently secured thereto, or the guard or housing may be sold separately, in the flat condition shown in Fig. 2, and applied to the trap by the purchaser. In this latter case, the purchaser will simply bend the end portions of the sheet as indicated by the dotted lines in Fig. 2, so as to form the channels 12, which may be slipped over the edges of the base of the trap and will thus hold the guard or housing in position.

It will thus be seen that the above described exceedingly cheap and simple attachment renders it impossible for the animal to gain access to the trigger or bait holder without placing itself directly in the path of movement of the cross bar 3 of the bail, and thus greatly increases the efficiency of traps of this character, and it is thought that the many advantages of my improved attachment will be readily appreciated without further discussion.

What I claim is:—

1. An attachment for traps having a base and a spring-actuated swinging bail pivoted thereto, comprising an arch shaped guard of sheet material adapted to be attached to the base at its opposite side edges at a point within the path of movement of said bail, the opening through the said guard being in a direction substantially at right angles to the pivotal axis of the bail.

2. An attachment for traps having a base, a spring actuated pivoted jaw urged toward the base, and a pivoted trigger mounted on the base, comprising an arch-shaped sheet metal guard adapted to be attached to said base so as to overlie said trigger, the opening through said guard being substantially at right angles to the pivotal axis of said jaw.

3. An attachment for traps having a base and a spring actuated jaw and pivoted trigger mounted on the base, comprising a piece of sheet material weakened along definite lines to provide portions which may be folded over opposite edges of the base of the trap and thus attached thereto, said sheet material, when thus applied to the base, constituting an arch shaped guard positioned to overlie said trigger.

4. The combination with a trap comprising a base and a spring actuated bail and trigger pivotally mounted thereon, of a sheet metal guard overlying said trigger and having an open end adjacent the path of movement of said bail, and opposite the pivotal axis thereof.

5. The combination with a trap comprising an elongated base, a spring actuated bail pivoted to said base near its middle, and a trigger mounted on said base at a point within said bail when in victim-holding position, of a housing overlying said trigger and occupying substantially the space within said bail, said housing having an open end adjacent one end of the base, past which open end that portion of said bail farthest from its pivot travels when moving on its pivot.

In testimony whereof I affix my signature.

HORACE M. MARSHALL.